(12) United States Patent
Koester et al.

(10) Patent No.: US 11,002,487 B2
(45) Date of Patent: May 11, 2021

(54) COUNTER FLOW HEAT EXCHANGER

(71) Applicant: Hanon Systems, Daejeon (KR)

(72) Inventors: Stephan Koester, Langerwehe (DE); Dominik Sernetz, Alpen (DE)

(73) Assignee: Hanon Systems, Daejeon (KR)

( * ) Notice: Subject to any disclaimer, the term of this patent is extended or adjusted under 35 U.S.C. 154(b) by 144 days.

(21) Appl. No.: 16/168,122

(22) Filed: Oct. 23, 2018

(65) Prior Publication Data

US 2019/0120560 A1 Apr. 25, 2019

(30) Foreign Application Priority Data

Oct. 24, 2017 (DE) .......................... 102017218973.8

(51) Int. Cl.
| | |
|---|---|
| *F28D 7/02* | (2006.01) |
| *F28F 1/36* | (2006.01) |
| *B60H 1/00* | (2006.01) |
| *B23P 15/26* | (2006.01) |
| *F28F 1/14* | (2006.01) |

(Continued)

(52) U.S. Cl.
CPC .............. *F28D 7/024* (2013.01); *B23P 15/26* (2013.01); *B60H 1/00342* (2013.01); *F28F 1/14* (2013.01); *F28F 1/24* (2013.01); *F28F 1/36* (2013.01); *B60H 1/3229* (2013.01); *F28D 7/106* (2013.01);

(Continued)

(58) Field of Classification Search
CPC . F28D 7/02; F28D 7/024; F28D 7/106; F28D 2021/008; F28D 2021/0068; F28F 21/06–068; F28F 2009/228; B60H 1/00342; B60H 1/3229
See application file for complete search history.

(56) References Cited

U.S. PATENT DOCUMENTS

| | | | | |
|---|---|---|---|---|
| 1,874,009 A | * | 8/1932 | Henshall | ............... F28D 1/0535 |
| | | | | 165/178 |
| 2,146,141 A | * | 2/1939 | Harris | ..................... F28D 7/022 |
| | | | | 165/161 |

(Continued)

FOREIGN PATENT DOCUMENTS

| | | |
|---|---|---|
| CN | 2783240 Y | 5/2006 |
| DE | 1129170 B | 5/1962 |

(Continued)

OTHER PUBLICATIONS

DE19628773A1—English machine translation (Year: 1998).*

*Primary Examiner* — Jianying C Atkisson
*Assistant Examiner* — Jose O Class-Quinones
(74) *Attorney, Agent, or Firm* — Norton Rose Fulbright US LLP; James R. Crawford

(57) ABSTRACT

A counter flow heat exchanger: has an inner container with radially outwardly projecting helical webs, a cylindrical housing, wherein an inner circumferential surface of the housing and the radially outer edges of the helical webs of the inner container are in contact such that a flow path is developed in which a first heat transfer fluid can flow between the helical webs of the inner container and the inner circumferential surface of the housing; a helical heat exchanger tube extending between the helical webs of the inner container such that a second heat transfer fluid can flow within this heat exchanger tube counter to the direction of flow of the first heat transfer fluid. A method for the production of a counter flow heat exchanger is also provided.

12 Claims, 5 Drawing Sheets

(51) Int. Cl.
*F28F 1/24* (2006.01)
*F28D 21/00* (2006.01)
*F28D 7/10* (2006.01)
*F28F 9/22* (2006.01)
*B60H 1/32* (2006.01)

(52) U.S. Cl.
CPC .......... *F28D 2021/008* (2013.01); *F28D 2021/0068* (2013.01); *F28F 2009/228* (2013.01)

(56) References Cited

U.S. PATENT DOCUMENTS

| | | | | |
|---|---|---|---|---|
| 3,131,553 A * | 5/1964 | Ross | ............... | F25B 39/00 62/506 |
| 4,167,211 A * | 9/1979 | Haller | ............... | F28F 9/0132 165/162 |
| 4,217,765 A * | 8/1980 | Ecker | ............... | F25B 43/006 62/503 |
| 4,227,572 A * | 10/1980 | Harlan | ............... | B21C 37/26 165/184 |
| 4,316,501 A * | 2/1982 | Bowden | ............... | F28F 1/003 165/163 |
| 4,365,483 A * | 12/1982 | Binger | ............... | F25B 39/04 165/104.19 |
| 4,440,217 A * | 4/1984 | Stieler | ............... | F28D 7/106 165/143 |
| 4,549,606 A * | 10/1985 | Sato | ............... | F28F 13/04 165/179 |
| 4,938,036 A * | 7/1990 | Hodgkins | ............... | F02M 31/20 123/541 |
| 5,249,623 A * | 10/1993 | Muller | ............... | B01D 35/18 165/156 |
| 5,309,987 A | 5/1994 | Carlson | | |
| 5,617,737 A * | 4/1997 | Christensen | ............... | B01D 1/02 62/487 |
| 6,293,335 B1 * | 9/2001 | Tawney | ............... | F28D 7/022 165/155 |
| 6,298,687 B1 * | 10/2001 | Dienhart | ............... | B60H 1/00342 62/471 |
| 6,463,757 B1 * | 10/2002 | Dickson | ............... | F25B 40/00 29/890.06 |
| 6,681,597 B1 * | 1/2004 | Yin | ............... | F25B 40/00 62/503 |
| 6,736,198 B2 * | 5/2004 | Zhu | ............... | F28D 7/024 165/156 |
| 6,751,983 B1 * | 6/2004 | Dienhart | ............... | B60H 1/3227 165/155 |
| 7,261,149 B2 * | 8/2007 | Nail | ............... | F28D 7/022 165/163 |
| 8,042,608 B2 * | 10/2011 | Baker | ............... | F28D 7/022 165/165 |
| 8,733,125 B2 * | 5/2014 | Heckt | ............... | F25B 43/006 62/512 |
| 9,415,335 B2 * | 8/2016 | Huff | ............... | F25B 1/10 |
| 2003/0121648 A1 * | 7/2003 | Hong | ............... | F25B 40/00 165/163 |
| 2008/0186039 A1 * | 8/2008 | Cannas | ............... | F24H 1/43 324/750.28 |
| 2016/0178293 A1 * | 6/2016 | Perez Lopez | ............... | F25D 3/107 165/109.1 |

FOREIGN PATENT DOCUMENTS

| | | |
|---|---|---|
| DE | 19628773 A1 | 1/1998 |
| DE | 102006017432 A1 | 10/2007 |
| DE | 602005006281 T2 | 5/2009 |
| DE | 102008028853 A1 | 12/2009 |
| DE | 102015217634 A1 | 5/2017 |

* cited by examiner

COUNTER FLOW HEAT EXCHANGER

This application claims priority from German Patent Application No. 102017218973.8 filed on Oct. 24, 2017, which is hereby incorporated by reference in their entirety.

The present invention relates to a counter flow heat exchanger, in particular for use in an air-conditioning system of a motor vehicle.

PRIOR ART

Operating an air-conditioning system requires a refrigerant that circulates in an appropriate circulation in the air-conditioning system for the exchange of heat with the air of the passenger compartment. Especially in motor vehicles it is herein necessary that the refrigerant, typically the refrigerant R744, is used in an internal heat exchanger such that it is protected against environmental influences. The refrigerant is subsequently utilized in a compressor-driven coolant circulation of the air-conditioning system to cool as well as also heat the air of the motor vehicle passenger compartment to be air-conditioned.

It is herein especially important for the electric motor that is typically used of the compressor of the coolant circulation to be cooled by means of a coolant. To achieve such, previously numerous and diverse combinations of internal heat exchangers and accumulators together have until now been used in order to realize a compact heat exchanger system.

An accumulator can herein be a container in a cooling unit or heat pump that is downstream of an evaporator in order to capture different coolant fill quantities in the liquid state due to different operating conditions and to hold available a refrigerant reserve in order to compensate the leakage losses occurring during the maintenance interval. Accordingly, accumulators can also be denoted as collectors.

For example, prior art discloses in DE 10 2006 017 432 A1 a combination of an integrated collector together with a helical, radially ribbed heat exchanger tube of the internal heat exchanger. Between a housing of the overall device and the collector an annular gap is herein developed in which the helical, radially ribbed heat exchanger tube, also referred to as cooling coil, is disposed, wherein between the turns of the helical heat exchanger tube by means of the radial ribs a channel system is developed in which flows the refrigerant. Such structuring enables the heat transfer in cross counter flow between the ribbed helical heat exchanger tube and the annular gap.

However, in this case the efficiency depends strongly on the distance of the helical heat exchanger tube from the collector as well as from the housing of the entire device. The efficiency furthermore is limited due to the flow control in cross counter flow. Moreover, the production of the radially projecting ribs on the heat exchanger tube of the helical heat exchanger involves an additional, and above all, a cost-intensive fabrication step. In addition, for this fabrication of the tube oils and greases are used which subsequently require complex steps for their removal. The production costs are hereby additionally increased and any remaining residual fractions of impurities can lower the overall efficiency of the system.

DE 10 2015 217 634 A1 also discloses a similarly structured device of an air-conditioning system with a helical heat exchanger tube and a collector integrated in the heat exchange device, wherein heat transfer takes place in cross flow along a helical heat exchanger tube. Particular is herein that radially between the heat exchanger tube and the housing of the device at least one axial bypass gap with predefined radial width is developed. Further, the outer surface of the helical heat exchanger tube is in contact with the housing, which reduces the efficiency of the device. The compactly developed bypass gap is furthermore very narrow and consequently leads to high pressure losses. In addition, the bypass gap results in a markedly more complex fabrication and increased production costs of the housing. The cut-outs provided in the housing for the bypass gap lead to reduced pressure resistance of the housing and makes greater wall thicknesses necessary which, in turn, leads to a weight increase of the device.

DESCRIPTION OF THE INVENTION

The present invention therefore has as its objective disclosing a device and a method for the production of such device, with which the above described problems can be at least partially resolved, and/or with which an efficient internal heat exchanger can be realized from a helical, preferably smooth, duct and with an inner container which exchange heat with one another in counter flow.

This objective is achieved according to the invention with a device having the characteristics described herein, as well as a method according as described herein. Preferred embodiments are also provided.

According to the invention the counter flow heat exchanger comprises according to the invention: an inner container with radially outwardly projecting helical webs; a cylindrical housing, wherein an inner circumferential surface of the housing and the radially outer edges of the helical webs of the inner container are in contact with one another such that a flow path is developed in which a first heat transfer fluid can flow between the helical webs of the inner container and the inner circumferential surface of the housing; and a helical heat exchanger tube that extends between the helical webs of the inner container such that a second heat transfer fluid can flow within this heat exchanger tube counter to the direction of flow of the first heat transfer fluid.

Through the contacting of the radially outwardly projecting helical webs of the inner container and the inner circumferential surface of the cylindrical housing a flow path can be realized quickly, simply and without requiring additional fabrication expenditures, in which a first heat transfer fluid can flow.

Such implementation entails the advantage that herein no additional machining steps for the production of the inner container or of the outwardly projecting helical webs of the inner container are necessary and, furthermore, no securement means are required in order to connect the inner container or its outwardly projecting helical webs with the cylindrical housing. Rather, form closure is sufficient to develop the flow path and simultaneously to prevent bypass flows which would lead to reduction of the heat transfer efficiency. Since no lubricants are utilized for the fabrication, the cleaning expenditures of the parts are low as is the risk of introducing impurities into the refrigerant circulation.

The term 'helical' can herein be understood and interpreted as describing the form of a screw. This means, similar to a screw the inner container includes a cylinder and threads on the peripheral surface of the cylinder, which, in this case, are the helical webs. Thus, an inclined plane uniformly wrapped about an inner container along the axial direction of the inner container is generated. Stated differently, the term 'helical' describes a curve form winding at constant inclination around the outer peripheral surface of the cylinder.

The inner container can, in particular, also be understood as an accumulator or "collector" that has the capacity to store excess coolant and, in the event of leakage losses, to compensate fluctuations in the coolant flow.

As stated in the introduction, between the outwardly projecting helical webs of the inner container a helical heat exchanger tube is developed between the webs of the inner container. In this way a heat exchange can take place between the inner volume of the heat exchanger tube and the outer volume developed between the helical webs of the inner container and the housing.

It is preferred for the coolant coming from the collector in the flow path for the first heat transfer fluid to be conducted at low pressure with low density. In the flow path for the second heat transfer fluid, consequently, the refrigerant coming from the gas cooler is conducted at high pressure level with high density. Since the two fluid flows are conducted in pure counter flow with respect to one another, the efficiency of the heat transfer or that of the heat exchanger is maximal.

Through the heat transfer in counter flow the efficiency of the heat transfer can be markedly improved in comparison to cross counter flows or cross flows. Moreover, the overall efficiency of the device can be enhanced since the heat exchanger tube is not covered by the limitation of the flow path, and consequently the entire surface of the heat exchanger tube can be utilized for heat transfer in the flow path.

According to the invention the heat exchanger tube is developed as a simple duct with helical form. This means that the heat exchanger tube has a "smooth" surface or a smooth outer peripheral surface, wherein "smooth" means that no projections or the like are developed on the surface of the duct. Thus, no further complex and expensive machining steps need to be performed on the duct and the fabrication costs can be markedly reduced.

In addition, through the realization from simple parts, in particular through the integrally developed inner container, the simple helical heat exchanger tube and the simple cylindrical housing, it becomes possible to reduce the fabrication and production costs without additional machining steps and with a small number of parts.

In general, with such a structure the efficient heat transfer in pure counter flow can be realized by means of simple and effective implementation.

The second heat transfer fluid flowing through the heat exchanger tube and the first heat transfer fluid flowing through the flow path can be the heat transfer medium or refrigerant R744 in liquid or gaseous form. This refrigerant is preferred for use since it does not have an ozone destruction potential, is not combustible and, in comparison to conventionally utilized fluorinated gases, generates negligible greenhouse effects. However, other heat transfer media can also be utilized in the counter flow heat exchanger without deviating from the scope of the invention.

Since the second heat transfer fluid can flow under high pressure in the helical heat exchanger tube, especially in the state of liquid density, the cross section of the helical heat exchanger tube can be smaller than the cross section of the flow path in which the first heat transfer fluid with less density flows. This means that in order to obtain an increased heat transfer rate, in a preferred implementation the cross section of the flow path can be greater than the cross section of the heat exchanger tube.

According to a further aspect of the invention the cylindrical housing is comprised of a ductile or plastically deformable material.

Such an implementation enables the radially outwardly projecting webs of the inner container to be rigid without needing to be bent during fabrication since in such a preferred implementation the cylindrical housing, after it has been positioned on the outer peripheral surface of the webs, by applying, in particular impressing, external mechanical forces generates a form closure between the radially outwardly projecting webs of the inner container and the inner circumferential surface of the cylindrical housing. Thereby a flow path can be realized quickly, simply and cost-effectively without the need to employ further machining steps or securement means.

According to a further aspect of the invention the helical heat exchanger tube comprises longitudinal ribs which, in the elongated state, extend in the axial direction on the outer surface of the heat exchanger tube.

The term 'axial' is herein to be understood as parallel to the inner axis of the heat exchanger tube and also be understood to mean 'longitudinal'.

It should be noted that the axis of the inner container is simultaneously also the axis of the cylindrical housing or the main axis of the helically extending heat exchanger tube.

The term 'radial' in the context of the heat exchanger tube refers to the direction extending from the tube center line outwardly to the outer circumference of the heat exchanger tube.

Through such implementation an increase in the heat exchange rate and simultaneously, in comparison to a radial ribbing, a decrease in the fabrication cost are enabled since in this case the fabrication can be carried out utilizing, for example, an extrusion profile. If a preferred implementation is intended to be realized with ribs extending axially parallel to the tube axis, it would only be necessary to include recesses in the profile extrusion die for the fabrication of the heat exchanger tube. Consequently, in comparison to radial ribs, no additional working is necessary and thus also no soiling of the structural parts occurs that is generated by machining processes.

Such ribs are integrated in particular to further raise the efficiency of the heat transfer. Through these ribs a comparatively small radius of the helical structure of the heat exchanger tube can be realized while simultaneously the weight and the overall size of the device can be reduced.

According to a further aspect of the invention the helical heat exchanger tube and the radially outwardly projecting webs of the inner container have the same pitch in the axial direction.

As pitch can herein be understood the spacing in the axial direction between two of the helically implemented and radially outwardly projecting webs of the inner container or the axial spacing between turns of the helical heat exchanger tube on an axis parallel to the axial direction of the heat exchanger tube or the housing. Stated differently, the "pitch" describes how rapidly the helical structure of the webs or of the heat exchanger tube advances along its axial axis.

Since the helical heat exchanger tube and the radially outwardly projecting webs have the same pitch, it becomes possible for the helical structures of the webs or the heat exchanger tube to run parallel to one another and without any contact sites or contact points of the heat exchanger tube and the webs of the inner container being generated. It is therewith possible for the entire heat transfer area, thus the outer peripheral surface of the helical heat exchanger tube, to be utilized for the heat transfer.

In a preferred implementation the radially outwardly projecting helical webs of the inner container include at least one discontinuity, wherein it is preferred that every second turn of the radially outwardly projecting helical webs on the inner container is omitted.

Stated differently, two turns of the helix of the heat exchanger tube can in each instance extend between two radially outwardly projecting webs of the inner container.

This leads to the doubling of the cross sectional area of the flow path and to a disproportionately lower pressure loss on the flow path side. The heat exchanger can thereby be adapted to individual target values for degree of transfer and loss of pressure.

Instead of every second turn of the radially outwardly projecting helical webs of the inner container, analogously also more webs per interval can be skipped for a threefold or fourfold cross sectional area of the flow path.

It is preferred for the radially outwardly projecting helical webs of the inner container to be deformable.

It is furthermore preferred for the diameter of the radially outwardly projecting helical webs to be greater than the diameter of the cylindrical housing.

Such implementations make it feasible that during the assembly of the housing to the helical webs, the webs can be deformed and therewith securing the form closure can additionally be achieved. Especially with a deformation of the radially outer edge of the helical web reliable sealing of the flow path is ensured. Deformation of the web over its entire radial length is also conceivable in order to realize the form closure. Plastic as well as also elastic deformation can herein be sufficient for achieving the sealing of the flow path. This leads to a markedly simplified fabrication process without additional parts and/or tools, and, moreover, to a more enduring and longer-lasting structure with lower failure probability.

It is further preferred for the radially outwardly projecting helical webs of the inner container to be comprised of synthetic material, preferably of a two-component synthetic material.

Through such an implementation it becomes feasible for the radially outwardly projecting helical webs to be fabricated especially cost-effectively without additional machining steps or further finishing treatment using injection molding for example and for soiling in the webs to be avoided. This means that a cost-effective and precise production of the webs is feasible without additional parts or cost-intensive machining processes.

Such an implementation of the helical webs is further especially advantageous for a simple and cost-effective realization of a seal of the flow path between the cylindrical housing and the inner container. Accordingly, for this seal no machining of the cylindrical housing is necessary in order to accomplish sealing off the flow path.

The two-component synthetic material, in addition, makes it possible for the flow path to absorb markedly higher differential pressures thereby that a radially inner section of the radially outwardly projecting helical webs is implemented of a more rigid material than the radially outer edges of the radially outwardly projecting helical webs. This results in the radially inner section being stiffer and consequently capable of withstanding higher pressures and, simultaneously, in the radially outer edges of the helical webs being capable through easier deformation to serve for sealing the flow path in the form closure region between the webs and the cylindrical housing. Through such an implementation it is further possible to avoid bypass flows even at higher differential pressures, respectively high pressure loss, and to conduct the first heat transfer fluid steadily in the flow path.

It is especially preferred for the helical heat exchanger tube not to come into contact with the housing and/or the inner container.

This means the diameters of the helical webs and of the of the shell outer housing are greater than the outer diameter of the helical heat exchanger tube. Simultaneously the inner diameter of the helical heat exchanger tube is greater than the outer base diameter of the inner container. The contact-free structure obtained thereby of the heat exchanger tube in the flow path yields the greatest possible heat transfer area and therewith efficiency of the heat transfer. The cross sectional area of the flow path thereby becomes maximal and the pressure loss entailed therein in the flow path becomes minimal.

The present invention comprises further a method for the production of a counter flow heat exchanger with the following steps: providing an inner container with radially outwardly projecting helical webs and a helical heat exchanger tube, wherein the pitch of the helical heat exchanger tube corresponds to the pitch of the helical heat exchanger tube; threading the helical heat exchanger tube into the turns of the helical webs of the inner container; providing a cylindrical housing of the heat exchanger, wherein the diameter of the inner circumferential surface of the cylindrical housing is laid out such that it corresponds at least to the diameter of the radially outer edges of the helical webs of the inner container or the diameter of the helical webs of the inner container is greater than the inner circumferential surface of the cylindrical housing; generating a sealed-off flow path between the helical webs of the inner container and the housing through contact between the radial outer edges of the helical webs of the inner container and the inner circumferential surface of the cylindrical housing.

It is thereby possible that after the helical heat exchanger tube has been threaded in and after the emplacement of the cylindrical housing, a sealed flow path can simply and rapidly be established and the first heat transfer fluid can flow at low pressure in the flow path in the opposite direction with respect to the second heat transfer fluid at high pressure in the helical heat exchanger tube and in this way heat is efficiently transferred.

Apart from the advantages already described above and the technical effects of the invention, it is further possible to establish an efficient counter flow heat exchanger through such a method according to the invention by means of simple assembly steps without additional securement means and/or without a large number of parts. In particular the steps of threading-in of the heat exchanger tube with the subsequent sealing-off of the flow path by emplacing the cylindrical housing enable the certain and bypass-free generation of a flow path on the outside of the inner container and the rapid and tool-free fabrication of an efficient counter flow heat exchanger.

In a further aspect of the method it is feasible for the radially outwardly projecting helical webs to have a greater diameter than the inner circumferential surface of the housing, wherein the radially outer edges of the helical webs of the inner container during the generation of the sealed channel come into contact with the inner circumferential surface of the housing and become deformed.

This yields the advantage that a simple and secure form closure can be developed between the inner circumferential surface of the cylindrical housing and the radially outwardly projecting webs of the inner container and, thus, flow loss through bypass flows between the webs and the housing can be prevented. Further, thereby a simplified production and especially cost-effective implementation of the counter flow heat exchanger is possible.

According to a further aspect of the method the housing is comprised of a ductile or plastically deformable material such that the generation of the sealed channel by means of applying external mechanical forces onto the housing at the radially outwardly projecting helical webs of the inner container is carried out.

This means that after the helical heat exchanger tube has been threaded between the radially outwardly projecting webs of the inner container and after emplacing the housing, the housing can be brought from the outside into contact with the radially outwardly projecting webs of the inner container by means of applying external mechanical forces (on the finished part) such that a seal is formed between the webs and the inner circumferential surface of the housing and the flow path is therewith sealed off.

According to a further aspect of the method the radially outwardly projecting helical webs of the inner container are comprised of a two-component synthetic material, wherein a radially outer section of the helical webs is comprised of a softer synthetic material than a radially inner section of the helical webs and during the generation of the sealed-off flow channel the radially outer section of the helical webs is deformed by the inner circumferential surface of the housing.

Through such an implementation it is possible to generate simultaneously a more rigid flow path, wherein the risk of leakage losses or bypass flows is reduced and the form closure between the radially outwardly projecting webs of the inner container and the inner circumferential surface of the housing can be established in an especially controlled manner and a simple and durable device can be produced.

BRIEF DESCRIPTION OF THE DRAWING

With reference to schematic drawings a counter flow heat exchanger according to an exemplary embodiment will be described in the following. General examples of such devices are utilized for example in motor vehicles to carry out the air conditioning of a passenger compartment. Additional modifications of certain individual characteristics described in this connection can each be individually combined with one another in order to show new embodiments. In the drawing depict.

DESCRIPTION OF THE PREFERRED EMBODIMENT

Figure 1:
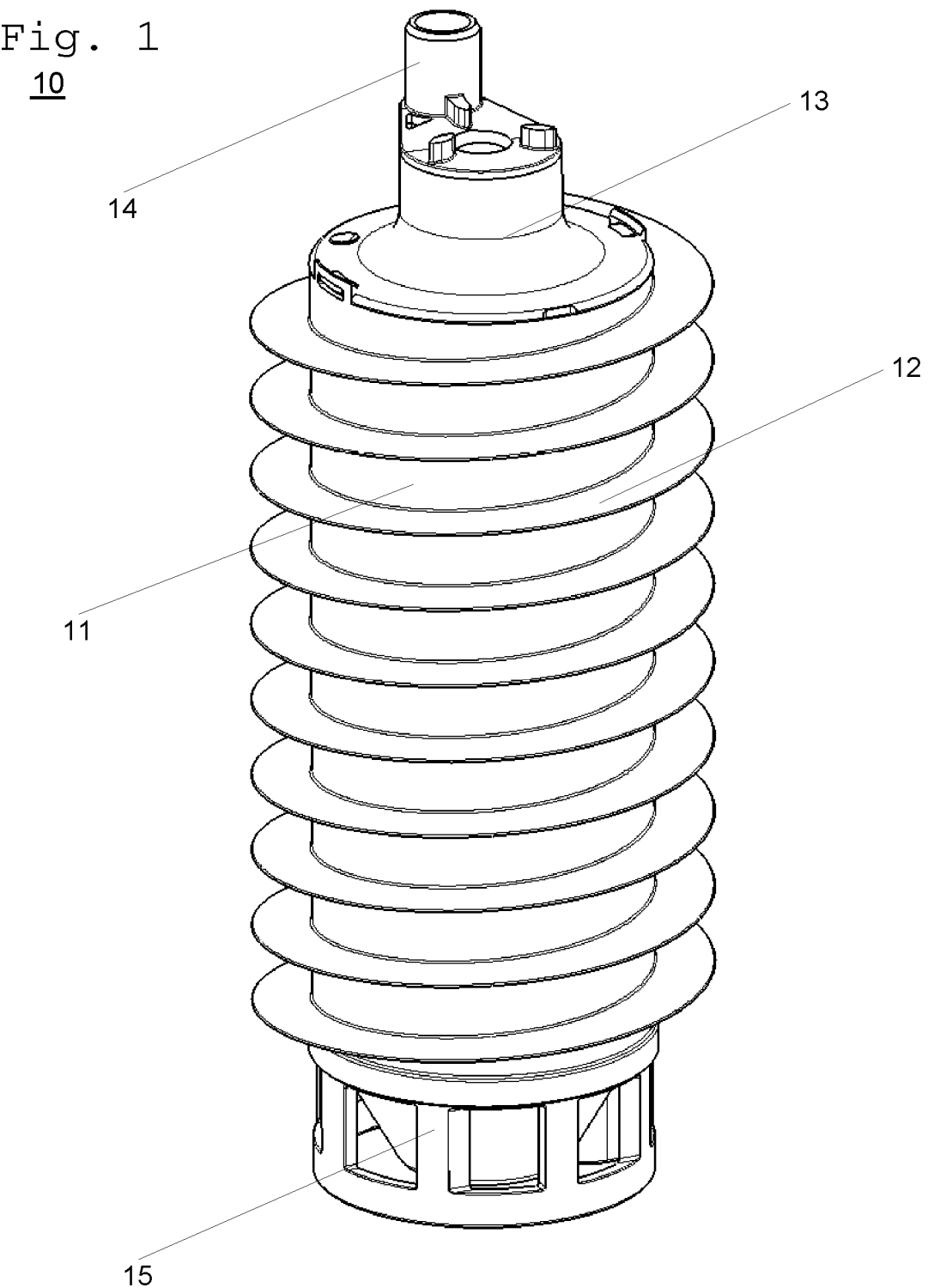
FIG. 1: a schematic representation of an inner container with radially outwardly projecting helical webs.

FIG. 1 shows a schematic representation of an inner container 10 with radially outwardly projecting helical webs 12. These radially outwardly projecting helical webs 12 extend from the shell surface 11 that corresponds to the outer peripheral surface of the cylindrical inner container 10. The webs 12 exhibit herein a constant spacing between the particular turns of the webs 12. Stated differently, they have a constant pitch along the axial direction of the inner container 10. The representation shows, moreover, that the helical webs 12 have a constant outer, peripheral diameter.

In the embodiment example depicted in FIG. 1 of the present invention the webs 12, radially outwardly projecting from the shell surface 11 of the cylindrical inner container 10, are implemented integrally with the shell surface 11 of the inner container 10. This means that the inner container 10 without any further machining can preferably be produced as a single part with the radially outwardly projecting helical webs 12, for example using an injection molding process. Consequently, constant wall thicknesses at simultaneously cost-effective fabrication of the inner container 10 with radially outwardly projecting helical webs 12 can be realized integrally.

In a further embodiment, not shown, it is feasible for the radially outwardly projecting helical webs 12 of the inner container 10 to be deformable and/or be implemented of a two-component synthetic material.

In the exemplary embodiment of the present invention on the upper side and underside, thus at the axial ends of the inner container 10, closure elements 13 are provided. The closure elements 13 generate the necessary upwardly and downwardly axial delimitation of the inner container 10 in which excess coolant fluid from an air-conditioning system can be collected.

Furthermore, to enable in precise and simple manner a connection of the inner container 10 to the further coolant circulation, FIG. 1 shows the coolant inlet pipe 14 provided for this purpose at the upper axial end of the inner container 10, such that in the assembled state of the counter flow heat exchanger excess coolant can be received within the inner container 10 through the coolant inlet pipe 14.

FIG. 1 additionally shows a cylindrical base element 15 for the axial staying of the inner container 10 within the counter flow heat exchanger. This base element 15 is disposed on the axial underside of the inner container 10 and the outer diameter of the base element 15 conforms with that of the shell surface 11 of the inner container 10. The lower closure element 13, further, can be disposed within the base element 15 and the height of the base element 15 is herein at least as great as the height of the closure element 13 of the inner container 10.

In the embodiment depicted in FIG. 1 of the inner container 10 all parts, in particular the shell surface 11 with the integrally implemented radially outwardly projecting helical webs 12, the upper and lower closure elements 13, the coolant inlet pipe 14 and the base elements 15 can be comprised of synthetic material and implemented by means of injection molding. However, other materials and fabrication methods are also feasible without deviating from the scope of the invention. Through this implementation the machining-free and cost-effective fabrication of the inner container 10 implemented thusly can be realized. It should be ensured that the temperature resistance and the material properties of the inner container 10 and the additional elements are selected such that they withstand the temperatures and pressures occurring during the heat exchange without impairment of the materials.

Figure 2:
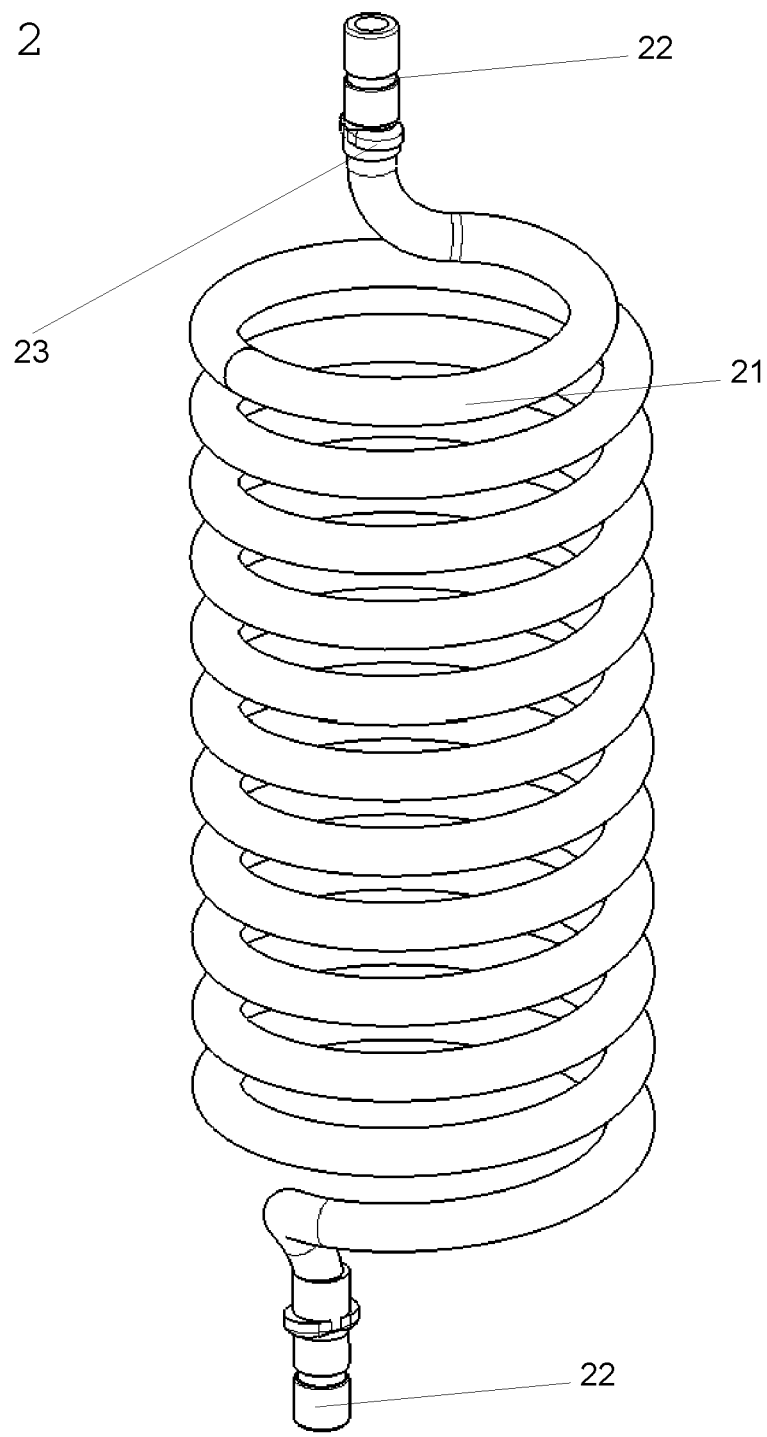
FIG. 2: a schematic representation of a helical heat exchanger tube.

FIG. 2 is a schematic representation of a helical smooth heat exchanger tube.

In the exemplary embodiment depicted in FIG. 2 the helical heat exchanger tube 21 is provided on the upper and lower end in the axial direction with connection elements 22 to enable therewith the connection to the further coolant circulation of an air-conditioning system. In addition, the connection elements 22 permit the positioning and securing of the helical heat exchanger tube 21 between the helical webs 12 of the inner container 10.

These connection elements 22 can be fixed in place by simply being pressed or clamped onto the heat exchanger tube 21. Other embodiments, however, are also conceivable as long as a sealing that withstands the occurring pressures and temperatures can be generated between the two elements. Furthermore, the integral implementation of the two elements, thus of the connection elements 22 and of the heat exchanger tube 21, is feasible in a further embodiment.

The heat exchanger tube 21 has a helical structure that extends in the same direction as the radially outwardly projecting helical webs 12 of the inner container 10. Furthermore, the radius of the helical windings of the heat exchanger tube 21 is selected such that it is greater than the radius of the shell surface 11 of the inner container 10.

Figure 3:
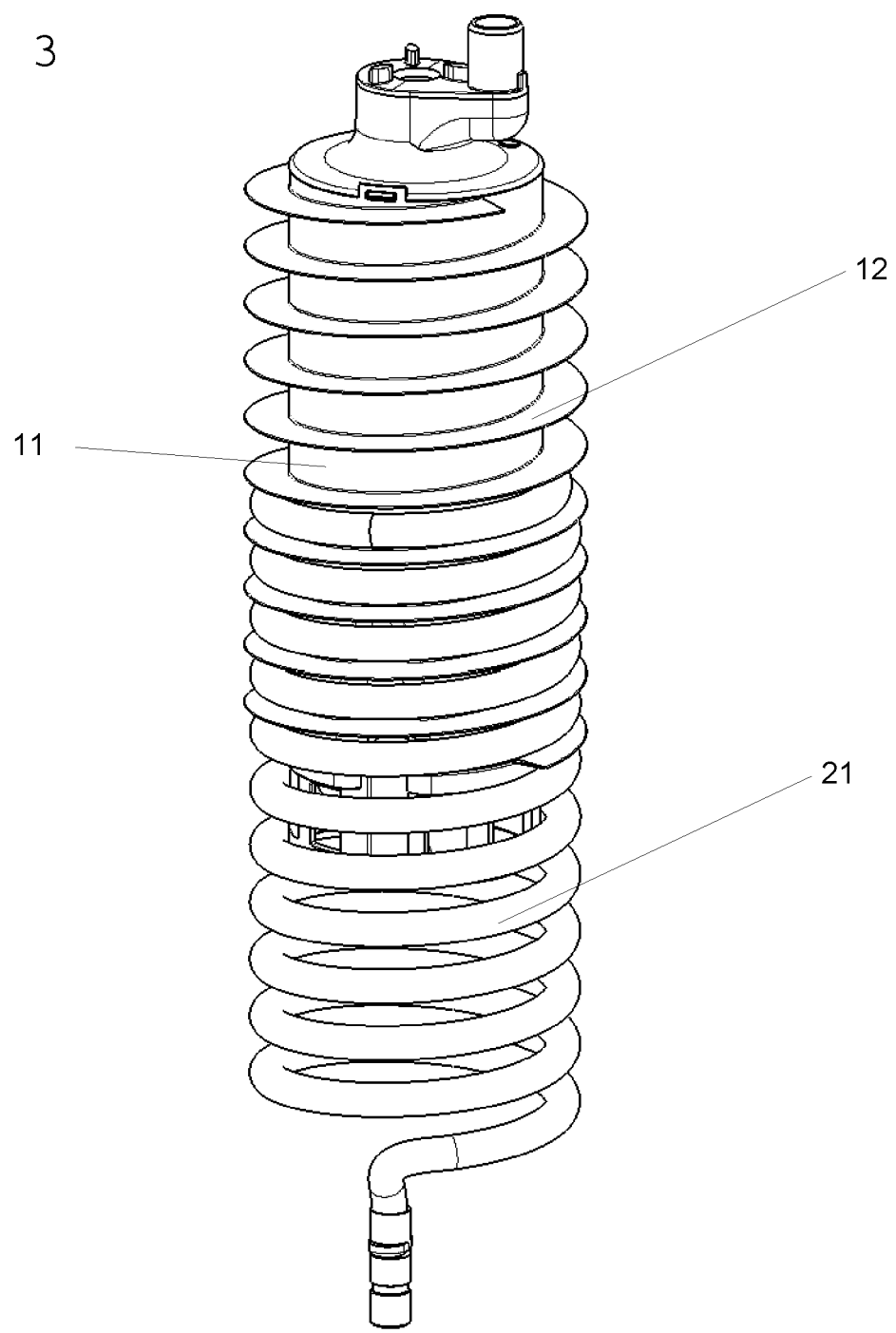
FIG. 3: a schematic representation of threading the helical heat exchanger tube in the axial direction between the radially outwardly projecting webs of the inner container.

FIG. 3 shows furthermore that the webs 12 and the heat exchanger tube 21 in the exemplary embodiment have the same pitch and the radial spacing between the individual turns of webs 12 is large enough so that the heat exchanger tube 21 can wind between the individual turns of webs 12 free of contact. This exemplary implementation makes it possible, on the one hand, for the heat exchanger tube 21, as shown in FIG. 3, to be simply and quickly threaded in, while, on the other hand, damage to the sensitive parts can be avoided. Further, thereby the entire surface of the heat exchanger tube 21 can be utilized for the heat transfer. This permits the most efficient heat transfer possible in the finished counter flow heat exchanger.

Figure 4:
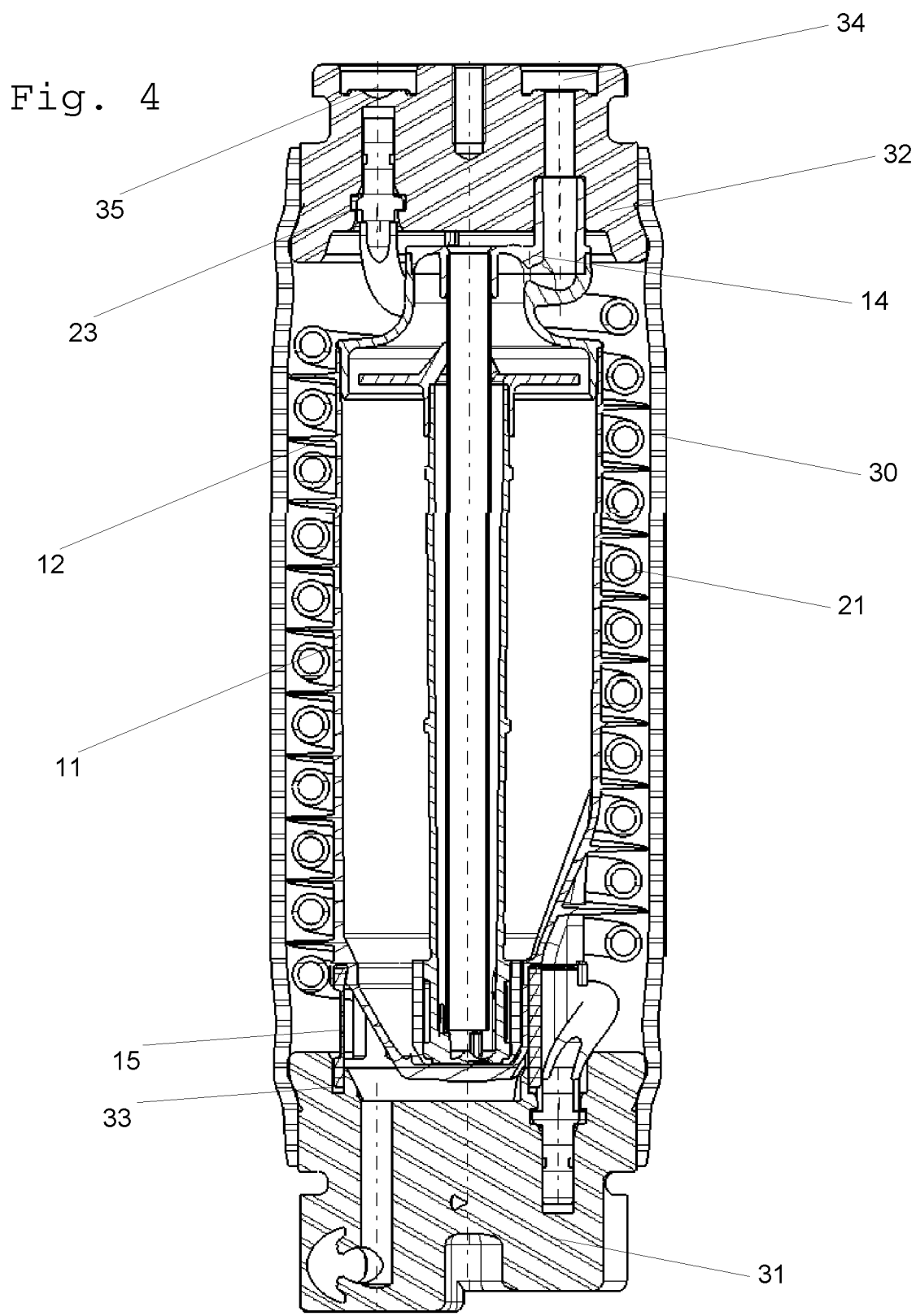
FIG. 4: a cross sectional representation along the axial direction of the heat exchanger of a counter flow heat exchanger according to an exemplary embodiment of the present invention.

FIG. 4 shows in this regard a cross sectional view along the center axis of the inner container 10 which simultaneously is also the center axis of the helical heat exchanger tube 21 and of the cylindrical housing 30.

After the threading, as shown in FIG. 3, of the heat exchanger tube 21 between the webs 12 of the inner container 10 has been completed, by emplacing the cylindrical housing 30 the flow path between the radially outwardly projecting helical webs 11 and the housing 30 is implemented. The radially inner circumference of housing 30 is implemented such that it comes into contact with the radially outer edges of the helical webs 12 and, by means of form closure, an adequate connection is generated such that a sealing is formed and the flow path can be developed. This flow path conducts a first heat transfer fluid and enables in this way the heat transfer between the inner container and the second heat transfer fluid conducted in the heat exchanger tube 21. Particular is herein that the first heat transfer fluid flows counter to the direction of the second heat transfer fluid such that as efficient a heat transfer as possible can be realized in a compact implementation.

The cylindrical housing 30 forms the radially outer peripheral surface of the counter flow heat exchanger. For the closure of the counter flow heat exchanger in the axial direction a lower closure element 31 is developed on the underside. In this lower closure element 31 the inner container 10 can be positioned by means of base element 15 that supports the inner container 10 in the axial direction and fixed in place in the recess 33 provided for this purpose. The diameter of the cylindrical recess 33 on the upper side of the lower closure element 31 herein corresponds to the diameter of the cylindrical base element 15.

On the axially upper side of the counter flow heat exchanger shown in FIG. 4, additionally, an upper closure element 32 is developed. The upper closure element 32 comprises herein a first opening 34 for the excess coolant of the air-conditioning system, which simultaneously is the first heat transfer fluid flowing through the flow path. The first heat transfer fluid can accordingly be introduced into the inner container 10 into the inner container 10 through the first opening 34 by means of the coolant inlet pipe 14. Herein, in addition, through the connection of the first opening of the upper closure element 32 with the coolant inlet pipe 14 of the inner container 10, together with the connection of the base element 15 and the recess 33 at the lower closure element 15, the position of the inner container 10 is secured in the counter flow heat exchanger.

The upper closure element 32 comprises further a second opening 35 through which the second heat transfer fluid can be transferred by means of the connection element 22 to the heat exchanger tube. Consequently, the second heat transfer fluid flows in the heat exchanger tube counter to the direction of the first heat transfer fluid in the inner container 10 and in the flow path between the shell surface 11 of the inner container 10, the inner circumferential surface of housing 30, and the radially outwardly projecting helical webs 12.

Positioning the heat exchanger tube 21 in place is further secured through the fixing projections 23 of the connection element 22. The fixing projections 23 are integrally developed projections that are received in the upper closure element 32.

As shown in FIG. 4 the lower and upper closure element 31 and 32 delimit the axial end of the counter flow heat exchanger. In the exemplary embodiment the sealing at the axial ends is accomplished by means of form closure. This is realizable, for example, by means of pressing the closure elements onto the cylindrical housing 30. In a further embodiment it is feasible for this to be carried out by material closure such as by means of welding, soldering or adhesion. Other fabrications processes, however, are also feasible without deviating from the scope of the invention.

Generally, the radially outwardly projecting webs 12, as well as the shell surface 11 and the inner circumferential surface of the cylindrical housing 30 consequently delimit the flow path along which the first heat transfer fluid flows helically and in which the heat exchanger tube 21 is developed.

Figure 5:
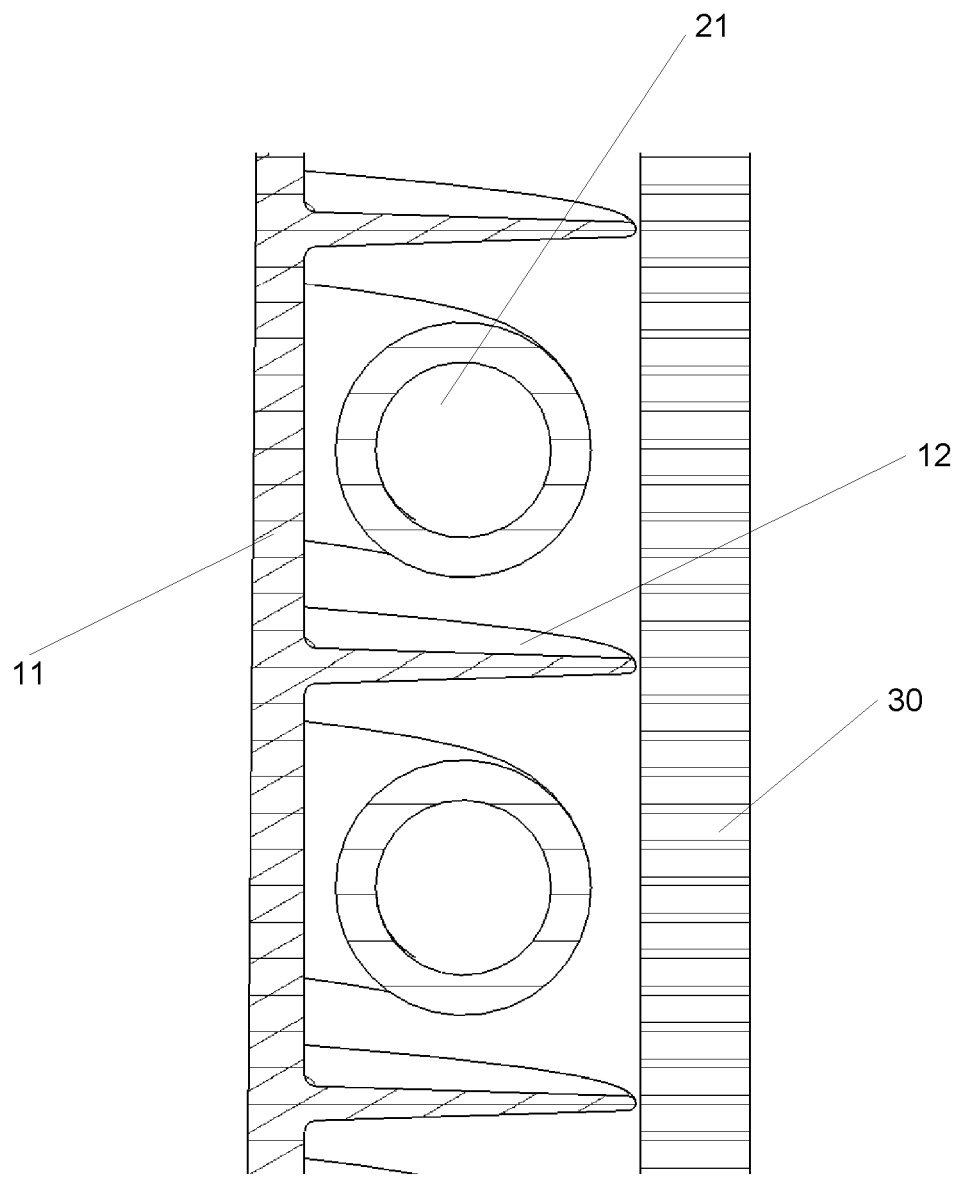
FIG. 5: an enlarged partial cross sectional representation of the flow path between the radially outwardly projecting helical webs of the inner container and the housing with a heat exchanger tube extending helically thereinbetween.

The more precise flowing characteristics of the first and the second heat transfer fluid in the flow path and in the heat exchanger tube is explained in the enlarged representation of the heat transfer region shown in FIG. 5.

As shown in FIG. 5, the heat transfer takes place between the above described flow path and the outer peripheral surface of the heat exchanger tube 21. Since in the heat exchanger tube 21 a fluid with very high density, liquid density, flows as the second heat transfer fluid, the inner cross sectional area of the heat exchanger tube 21 can be smaller than the cross sectional area of the flow path. In the flow path itself the first heat transfer fluid flows counter to the direction of the second heat transfer fluid in the heat exchanger tube 21, Consequently, due to the oppositely flowing heat transfer fluids, the desired heat transfer takes place efficiently in counter flow.

In other, not depicted, embodiments, it is further conceivable for the heat exchanger tube 21 to comprise ribs in the axial direction of the inner container in order to increase the heat transfer efficiency further.

According to the above device and the above method it is feasible to produce cost-effectively and quickly an efficient counter flow heat exchanger from a small number of parts.

LIST OF REFERENCE NUMBERS

10 Inner container
11 Shell surface
12 Webs
13 Closure element of the inner container 10
14 Coolant inlet pipe
15 Base element
21 Heat exchanger tube
22 Connection element
23 Fixing projections
30 Housing
31 Lower closure element of the counter flow heat exchanger//housing
32 Upper closure element of the counter flow heat exchanger//housing
33 Recess
34 First opening
35 Second opening

The invention claimed is:

1. A counterflow heat exchanger comprising:
an inner container with radially outwardly projecting helical webs;
a cylindrical housing, wherein an inner circumferential surface of the housing and the radially outer edges of the helical webs of the inner container are in contact such that a flow path is developed in which a first heat transfer fluid can flow between the helical webs of the inner container and the inner circumferential surface of the housing;
a helical heat exchanger tube extending between the helical webs of the inner container such that a second heat transfer fluid can flow within this heat exchanger tube counter to the direction of flow of the first heat transfer fluid;
wherein the radially outwardly projecting helical webs of the inner container are comprised of two-component synthetic material, wherein a radially outer section of the helical webs is comprised of a softer synthetic material than a radially inner section of the helical webs and the radially outer section of the helical webs is deformed by the inner circumferential surface of the housing.

2. A counterflow heat exchanger according to claim 1, wherein the helical heat exchanger tube has a smooth outer peripheral surface and does not comprise ribs.

3. A counterflow heat exchanger according to claim 1, wherein the helical heat exchanger tube comprises longitudinal ribs extending in the elongated state in the axial direction on the outer surface of the heat exchanger tube.

4. A counterflow heat exchanger according to claim 1, wherein the helical heat exchanger tube and the radially outwardly projecting helical webs have the same pitch in the axial direction.

5. A counterflow heat exchanger according to claim 4, wherein the housing comprises the plastically deformable material 15.

6. A counterflow heat exchanger according to claim 1, wherein the housing is comprised of ductile or plastically deformable material.

7. A counterflow heat exchanger according to claim 1, wherein the radially outwardly projecting helical webs of the inner container comprise at least one discontinuity.

8. A counterflow heat exchanger according to claim 1, wherein the helical heat exchanger tube is not in contact with the housing and/or the inner container.

9. A method for the production of a counter flow heat exchanger comprising the following steps:
providing an inner container with radially outwardly projecting helical webs and a helical heat exchanger tube, wherein the pitch of the helical heat exchanger tube corresponds to the pitch of the helical webs of the inner container;
threading the helical heat exchanger tube between the turns of the helical webs of the inner container;
providing a cylindrical housing of the counter flow heat exchanger, wherein the diameter of the inner circumferential surface of the cylindrical housing is laid out such that it at least corresponds to the diameter of the radially outer edges of the helical webs of the inner container or that the diameter of the helical webs of the inner container is greater than the inner circumferential surface of the cylindrical housing;
generating a sealed-off flow path between the helical webs of the inner container and the housing through the contact between the radially outer edges of the helical webs of the inner container and the inner circumferential surface of the cylindrical housing;
wherein the housing is comprised of a ductile or plastically deformable material such that the generation of the sealed flow channel is completed by means of applying, in particular impressing, external mechanical forces on the housing at the radially outwardly projecting helical webs of the inner container.

10. A method according to claim 9, wherein the radially outwardly projecting helical webs have a greater diameter than the inner circumferential surface of the housing, wherein the radially outer edges of the helical webs of the inner container during the generation of the sealed flow channel contacts with the inner circumferential surface of the housing and are deformed.

11. A method for the production of a counter flow heat exchanger comprising the following steps:
providing an inner container with radially outwardly projecting helical webs and a helical heat exchanger tube, wherein the pitch of the helical heat exchanger tube corresponds to the pitch of the helical webs of the inner container;
threading the helical heat exchanger tube between the turns of the helical webs of the inner container;
providing a cylindrical housing of the counter flow heat exchanger, wherein the diameter of the inner circumferential surface of the cylindrical housing is laid out such that it at least corresponds to the diameter of the radially outer edges of the helical webs of the inner container or that the diameter of the helical webs of the inner container is greater than the inner circumferential surface of the cylindrical housing;
generating a sealed-off flow path between the helical webs of the inner container and the housing through the contact between the radially outer edges of the helical webs of the inner container and the inner circumferential surface of the cylindrical housing;
wherein the radially outwardly projecting helical webs of the inner container are comprised of two-component synthetic material, wherein a radially outer section of the helical webs is comprised of a softer synthetic material than a radially inner section of the helical webs and in generating the sealed flow channel the radially outer section of the helical webs is deformed by the inner circumferential surface of the housing.

12. A method according to claim 11, wherein the radially outwardly projecting helical webs have a greater diameter than the inner circumferential surface of the housing, wherein the radially outer edges of the helical webs of the inner container during the generation of the sealed flow channel contacts with the inner circumferential surface of the housing and are deformed.

* * * * *